(12) United States Patent
Kerstein

(10) Patent No.: US 7,195,206 B2
(45) Date of Patent: Mar. 27, 2007

(54) APPARATUS AND METHOD FOR SERVICING AND INSPECTING SMALL FREE-FLYING PLATFORMS IN ORBIT IN SPACE

(75) Inventor: Lothar Kerstein, Sottrum (DE)

(73) Assignee: Eads Space Transportation GmbH, Bremen (DE)

( * ) Notice: Subject to any disclaimer, the term of this patent is extended or adjusted under 35 U.S.C. 154(b) by 210 days.

(21) Appl. No.: 10/821,661

(22) Filed: Apr. 8, 2004

(65) Prior Publication Data
US 2004/0245404 A1 Dec. 9, 2004

(30) Foreign Application Priority Data
Apr. 9, 2003 (DE) ................. 103 16 131

(51) Int. Cl.
*B64C 1/00* (2006.01)
(52) U.S. Cl. .................... 244/158.1; 49/25
(58) Field of Classification Search ........... 244/158.1, 244/159.4, 173.1, 173.2, 173.3, 172.4, 172.5, 244/137.1; 49/25
See application file for complete search history.

(56) References Cited

U.S. PATENT DOCUMENTS

| | | | | | |
|---|---|---|---|---|---|
| 3,380,687 | A | * | 4/1968 | Ford et al. | 244/173.3 |
| 4,105,241 | A | * | 8/1978 | Mee | 294/86.4 |
| 4,132,373 | A | * | 1/1979 | Lang | 244/159.4 |
| 4,206,390 | A | * | 6/1980 | Jessup | 318/469 |
| 4,273,305 | A | * | 6/1981 | Hinds | 244/172.5 |
| 4,583,082 | A | * | 4/1986 | Naylor | 340/545.3 |
| 4,588,150 | A | * | 5/1986 | Bock et al. | 244/172.4 |
| 4,657,211 | A | * | 4/1987 | Fuldner et al. | 244/172.5 |
| 4,667,908 | A | * | 5/1987 | Hayden et al. | 244/172.5 |
| 4,792,108 | A | * | 12/1988 | Bull | 244/159.4 |
| 4,896,848 | A | * | 1/1990 | Ballard et al. | 244/171.3 |
| 4,929,009 | A | * | 5/1990 | Vandersluis et al. | 294/2 |
| 4,929,011 | A | * | 5/1990 | Vandersluis et al. | 294/86.4 |
| 4,955,654 | A | * | 9/1990 | Tsuchihashi et al. | 294/86.4 |
| 4,964,596 | A | * | 10/1990 | Ganssle et al. | 244/172.5 |

(Continued)

FOREIGN PATENT DOCUMENTS

DE  19846327  3/2000

OTHER PUBLICATIONS www.answers.com, "Spacelab", pp. 1-3.*
www.answers.com, "Remote Manipulator System", pp. 1-3.*

*Primary Examiner*—Teri Pham Luu
*Assistant Examiner*—Stephen A. Holzen
(74) *Attorney, Agent, or Firm*—W. F. Fasse; W. G. Fasse

(57) ABSTRACT

A small, substantially spherical, free-flying utility platform for use in space can be docked, inspected and serviced in an apparatus including a container with a chamber therein mounted on the outside of a space vehicle or space station. A motorized closing mechanism drives a door to selectively open or close an opening of the container into the chamber, and another mechanism automatically latches and locks the door. The door operations can be automatically triggered as the platform breaks the beams of light beam devices arranged in the container. The proper positioning of the platform in the container can be detected by a photoelectric switch. Capture and docking of the platform is facilitated by sloping funnel-shaped interior walls of the container, and properly shaped cushions and/or a docking cradle. When docked, the platform has its batteries recharged, its fuel tank refueled, and its electronics evaluated and diagnosed.

18 Claims, 1 Drawing Sheet

U.S. PATENT DOCUMENTS

| | | | |
|---|---|---|---|
| 5,050,821 A * | 9/1991 | Kerstein et al. | 244/173.1 |
| 5,145,130 A * | 9/1992 | Purves | 244/159.4 |
| 5,335,881 A * | 8/1994 | Zaguli | 244/171.9 |
| 5,350,138 A * | 9/1994 | Culbertson et al. | 244/159.6 |
| 5,449,211 A * | 9/1995 | Monford, Jr. | 294/65.5 |
| 5,510,686 A * | 4/1996 | Collier | 318/446 |
| 5,791,600 A * | 8/1998 | Thompson | 244/159.4 |
| 5,828,347 A * | 10/1998 | Rossi et al. | 343/882 |
| 5,982,341 A * | 11/1999 | Rossi et al. | 343/882 |
| 6,017,000 A | 1/2000 | Scott | |
| 6,216,057 B1 * | 4/2001 | Jesionowski | 700/214 |
| 6,239,767 B1 * | 5/2001 | Rossi et al. | 343/882 |
| 6,267,253 B1 * | 7/2001 | Jellicorse et al. | 211/13.1 |
| 6,437,527 B1 * | 8/2002 | Rhodes et al. | 318/280 |
| 6,439,508 B1 * | 8/2002 | Taylor | 244/158.3 |
| 6,523,783 B2 * | 2/2003 | Lounge et al. | 244/172.4 |
| 6,718,776 B2 * | 4/2004 | Wessling et al. | 62/60 |
| 2003/0010041 A1 * | 1/2003 | Wessling et al. | 62/60 |

* cited by examiner

APPARATUS AND METHOD FOR SERVICING AND INSPECTING SMALL FREE-FLYING PLATFORMS IN ORBIT IN SPACE

PRIORITY CLAIM

This application is based on and claims the priority under 35 U.S.C. §119 of German Patent Application 103 16 131.7 filed on Apr. 9, 2003, the entire disclosure of which is incorporated herein by reference.

FIELD OF THE INVENTION

The invention relates to a system, apparatus, and method for servicing and inspecting small free-flying platforms in orbit in space.

BACKGROUND INFORMATION

It is known to deploy various manned and unmanned spacecraft, space stations and flying bodies in orbit in space for carrying out various missions with scientific, experimental, communication, reconnaissance, or other purposes, and for inspecting, servicing, repairing or constructing other spacecraft or flying bodies, such as satellites, space shuttles, space stations, or the like. Furthermore, in this context it will be useful to provide small free-flying autonomous and automated platforms in orbit for carrying out or supporting the above mentioned utility functions or missions. This relates especially to missions for supporting the extra vehicular activities, or so-called EVA, of astronauts outside of spacecraft or other manned space bodies such as the space shuttle, space stations, or future planned (and as yet unplanned but possible) manned interplanetary missions. It will further be necessary to provide suitable apparatus for the inspection, maintenance, servicing, and operation of such small free-flying automatic platforms, in order to assure the continuous and permanent operational availability of these platforms and to optimize the operational processes to be carried out on these platforms. The prior art has not yet provided any such systems, apparatus, or methods.

SUMMARY OF THE INVENTION

In view of the above, it is an object of the invention to provide a system, apparatus, and method for servicing and inspecting small free-flying platforms in space, whereby the operating costs for space stations as well as the risk for astronauts working in such space stations can be considerably reduced. The invention further aims to avoid or overcome the disadvantages of the prior art, to achieve the advantages discussed above, and to achieve additional advantages as apparent from the present specification. The attainment of these objects is, however, not a required limitation of the present invention.

The above objects have been achieved according to the invention in a system comprising a free-flying platform for deployment in orbit in space as well as a servicing and inspection apparatus for servicing and inspecting the free-flying platform. The servicing and inspection apparatus particularly comprises a container that is mounted on the outside of a space station or space vehicle, and that encloses an inner chamber accessible through an opening that can be selectively opened or closed by a door. The chamber and the opening are dimensioned so as to be able to receive the platform in the chamber. The apparatus further includes a door closing mechanism that can close the door in order to secure or fix the platform in the chamber of the container. The platform is preferably substantially spherical with regard to its exterior shape or configuration. The term "substantially spherical" means that the overall outer configuration of the platform is generally ball-shaped and a majority of its outer configuration is convexly curved, but does not require a perfectly spherical configuration.

The platform can be equipped with various different devices and instruments as needed for any given mission, i.e. for carrying out various different utility functions or operational processes in a given mission. For example, the platform may be equipped with sensors, cameras, communication equipment, experimental or testing instrumentation, tools, etc., as well as on-board electronics preferably including an on-board computer, and also positioning, navigation, guidance and propulsion systems including a fuel tank and low impulse maneuvering thrusters. The platform is thus provided to support the EVA activities of an astronaut outside of the space vehicle or space station, or to autonomously carry out certain functions outside of the space vehicle or space station without the need of an astronaut on EVA.

The servicing and inspection apparatus is equipped to carry out all necessary inspection, monitoring and servicing of the free-flying autonomous platform during or between the particular mission procedures carried out by the platform. In this regard, the servicing and inspection apparatus is also highly autonomous and/or remotely controlled. Preferably, the door closing mechanism is driven by a motor, and can be automatically triggered or controlled, for example by means of at least one light beam, e.g. forming a light beam barrier, in the chamber of the container. In this regard, the entry of the platform into the chamber of the container automatically triggers and controls the operation of the motor driven door closing mechanism. Furthermore, positioning marks, reflectors, and/or light emitting diodes can be provided on the inner side of the door or around the inner rim of the container opening, to cooperate with the light beams in the operation of closing, sealing and latching the door. In this regard, the door is further provided with a power-driven latching and locking mechanism. The proper positioning of the platform within the chamber can be ensured by funnel-shaped sloping or tapering inner walls of the container so as to guide or "funnel" the platform into the proper position. The positioning of the platform in the chamber can be further monitored and verified by a camera arranged in the chamber.

Additionally or alternatively, a photoelectric switch arranged in a side wall of the chamber can detect the positioning of the platform.

The invention thus provides an external platform servicing and inspection apparatus that is preferably arranged outside of a space vehicle or space station, for example preferably close to an exit hatch of a crew airlock. Thus, the apparatus is easily accessible by the astronauts. Thereby, extra vehicular activities by astronauts can be reduced to a minimum or possibly even completely avoided in certain situations. This is possible because the free-flying self-contained platform can carry out various utility functions outside of the aircraft, such as inspection and maintenance or repair functions on the space vehicle or space station, as well as scientific, experimental, testing, communication, reconnaissance, sensing, or other functions.

In this regard, the platform is so equipped and embodied that it can automatically carry out such functions or can be remotely controlled by the astronauts via a monitoring and control station provided for this purpose inside the space vehicle or space station. Thus, the astronauts can remain inside the space vehicle or space station, while the platform carries out the necessary functions outside. Then, the servicing and inspection apparatus receives, inspects, services, and conditions the platform after the completion of the required extra vehicular functions, and safely stores and secures the platform until the next mission is to be carried out by the platform. At that time, the platform will again be released and deployed from the servicing and inspection apparatus. The servicing and inspection carried out by the apparatus with regard to the platform may, for example, involve electrical recharging of on-board batteries of the platform, refilling propulsion fuel tanks of the platform, testing the proper functionality of on-board electronics, instrumentation, tools, or the like provided on the platform, inspecting the platform for any damage, etc.

The above objects have further been achieved according to the invention in a method of using the above described free-flying platform and servicing and inspection apparatus in a space mission. The method according to the invention preferably involves the following method steps, features or functions provided by the servicing and inspection apparatus for the platform. First, the platform is secured in the apparatus to be transported into space, whereby the apparatus securely holds and protects the platform. The apparatus further serves as a "parking garage" for intermediately storing the platform in orbit on the outside of the space vehicle or space station. The platform and the apparatus in which it is secured can also be conveniently transferred together as a unit from a transport vehicle to an orbiting space station.

Meanwhile, the apparatus further serves for the preservation and maintenance of the platform. Particularly, the apparatus protects the platform from meteorite impacts and cosmic radiation. Furthermore, the apparatus provides thermal protection, tempering, and conditioning for the platform. The apparatus further includes installed equipment for automatic testing, evaluation, and error or fault recognition in the operation of various systems of the platform. The apparatus further provides for the energy supply of the platform, for example an electrical power source for recharging the batteries of the platform.

When the platform is to carry out or assist in a particular extra vehicular mission, the platform is released and deployed from the apparatus. Then, the apparatus carries on an ongoing communication with the platform, for example to monitor and/or control the platform, either autonomously from a control program being executed in the apparatus, on-board the platform, or via remote control from a monitoring and control station in the space vehicle or space station. Once the mission is completed, the platform returns to and approaches the apparatus, and then the platform is captured and secured in the chamber of the apparatus. Finally, the apparatus provides convenient handling as a unit by the astronauts, and for this purpose the apparatus is preferably equipped with exterior handrails, handles, or grips.

Among others, an essential advantage of the servicing and inspection apparatus according to the invention is the immediate external accessability, availability, and operational readiness of the platform in combination with the apparatus. Furthermore, the apparatus makes it possible to receive or read-out and evaluate mission data from the platform.

Moreover, the reduction or avoidance of EVA activities by the astronauts carries many advantages. For example, a time-consuming preparation of the astronauts for EVAs in critical situations, for example in the event of a collision or other accident, is no longer necessary. Similarly, in an emergency situation, the crew no longer needs to leave the space vehicle or space station. Instead, the platform can be immediately deployed from the servicing and inspection apparatus, to carry out an EVA inspection, repairs or the like on the outside of the space vehicle or space station.

The combination of the autonomous automated platform together with the servicing and inspection apparatus according to the invention is extremely flexible and adaptable, and enables a very broad range or spectrum of applications. Places or situations that would otherwise not be accessible can now be safely and reliably approached and inspected using the inventive system. This is achieved, for example, in that the preferred embodiment of the inventive system uses a platform with a generally spherical and soft resilient outer skin without protrusions, projections or sharp corners. Thus, the platform is unlikely to become stuck or entangled, or to cause damage to other components, such as exterior components of the space vehicle or space station. Furthermore, in order to reduce or avoid the possibility of damage during flight maneuvers, the thrust and the flight speed or maneuvering speed of the platform are minimized.

The risk and the costs of extra vehicular activities are thus considerably reduced or even completely eliminated in some circumstances. Moreover, the operational process sequences of various extra vehicular operations can be optimized through the use of the inventive system.

BRIEF DESCRIPTION OF THE DRAWINGS

In order that the invention may be clearly understood, it will now be described in connection with an example embodiment thereof, with reference to the accompanying drawings, wherein.

DETAILED DESCRIPTION OF A PREFERRED EXAMPLE EMBODIMENT AND OF THE BEST MODE OF THE INVENTION

Figure 1:
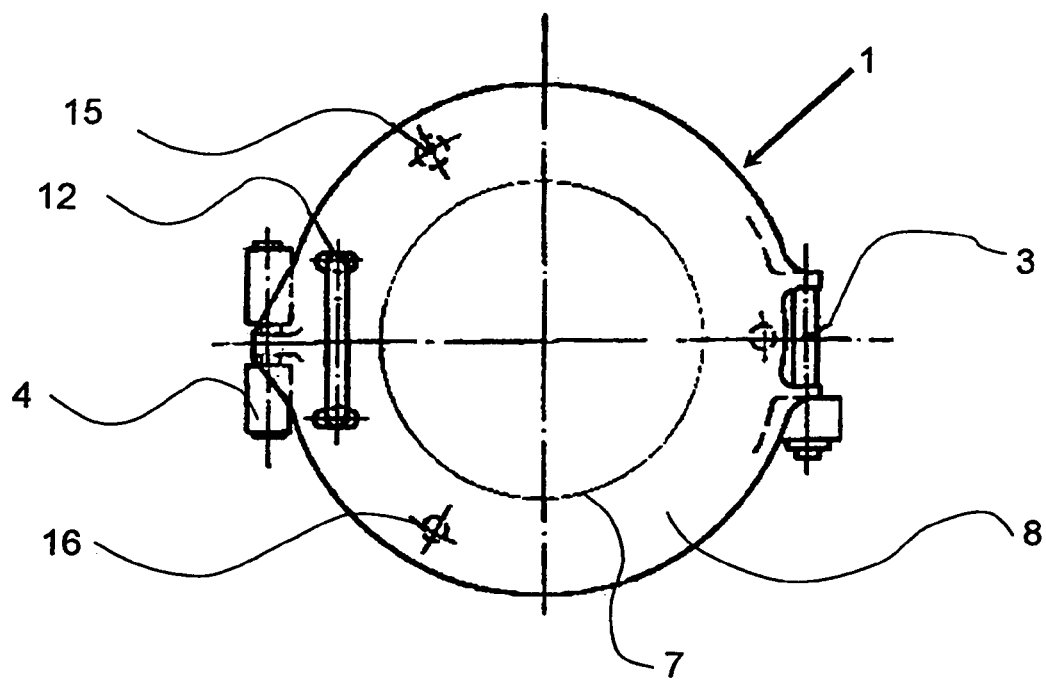
FIG. 1 shows a schematic side view of a servicing and inspection apparatus receiving therein a free-flying utility platform according to the invention.
Figure 2:
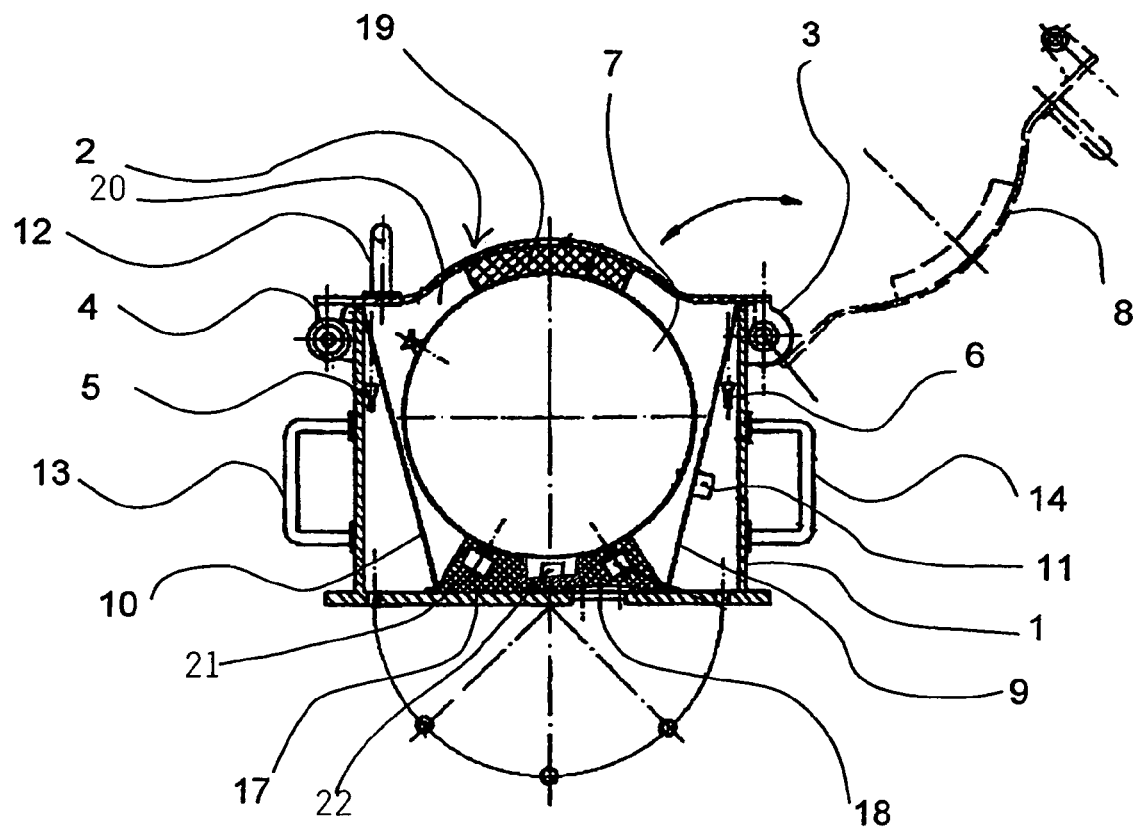
FIG. 2 is a schematic sectioned top plan view of the apparatus and the platform according to FIG. 1.

Referring to FIGS. 1 and 2, the inventive system comprises a small free-flying platform 7 that is constructed and adapted to carry out various utility functions when deployed in space and particularly in orbit in connection with a space vehicle or a space station. The platform 7 preferably has a substantially spherical outer configuration without protrusions or projections.

The inventive system further comprises a servicing and inspection apparatus adapted to store, inspect and service the free-flying platform 7. The apparatus comprises a container 1 that is constructed in a lightweight manner, e.g. using light metal alloys and/or composite materials. The container 1 has an opening 2 leading into a chamber 20 that is otherwise enclosed within the container 1. The chamber 20 is dimensioned and configured to receive the free-flying platform 7 therein. The apparatus further comprises a door 8 that is selectively openable or closeable by means of a motor-driven closing mechanism 3, so as to selectively close or open the opening 2 with the door 8. The apparatus still further comprises a powered latching and locking mechanism 4 adapted to securely latch and lock the door 8 in a securely closed and preferably sealed condition with respect to the opening 2, e.g. during transport of the system into space or while the platform is not being used in space.

The closing mechanism 3 for selectively closing the door 8 so as to cover or close the opening 2 is preferably triggered and controlled in an automated manner by at least one, and in this example embodiment two, light beam devices 5 and 6 arranged in the container 1 to form light beam barriers. Namely, when the small free-flying platform 7, which is to be serviced and/or inspected, flies into the immediate proximity of the container 1, breaks the light beams formed by the light beam devices 5 and 6, the closing mechanism 3 will be automatically triggered so as to close the door 8. This aids in capturing the platform 7 and moving it into the chamber 20. Then, once the platform 7 has moved into the chamber 20, the closing door 8 securely presses and holds the platform 7 in the proper secured position within the chamber 20, as will be discussed further below. In the event of a failure of the automatic powered functions of the closing mechanism 3 and the latching and locking mechanism 4, the power actuators of these mechanisms are further provided with a manual override function, so that they can be manually or semi-manually operated by an astronaut under EVA conditions.

In order to facilitate the capture and entry of the free-flying platform 7 into the chamber 20 of the container 1, the chamber 1 preferably has funnel-shaped sloping or tapering interior walls 9 and 10, which serve to center and guide the platform 7 into the proper position in the chamber 20 of the container 1. Furthermore, one or more cushions or damping pads 19 that are made of a foam material shaped to the contour of the platform 7 are provided on the interior of the door 8 and/or the interior side walls 9 and 10 and/or the floor of the container 1 for positioning and then securely holding the platform 7 in the proper position in a shock-absorbing and vibration-absorbing manner.

To still further assist and guide the approaching flight of the small free-flying platform 7 toward and into the container 1, as well as orienting the platform 7 within the chamber 20 of the container 1, the apparatus includes positioning marks and/or reflectors and/or light emitting diodes 15 and 16 on the interior of the door 8 or around the upper rim on the interior of the container 1 in a distributed fashion. These positioning aids 15 and 16 provide positioning information for guiding the approaching flight, maneuvering and orienting the platform 7 relative to the container 1. A camera 22 can be arranged in the container 1 to monitor the approaching flight of the platform 7. The camera thereby provides the necessary information for manually or automatically correcting or guiding the flight maneuvers of the platform 7 during its approach and entry into the chamber 20.

As a further measure, a photoelectric switch 11 can be provided in the container 1, for example on at least one of the funnel-shaped sloping interior walls 9 and 10, in order to detect and signal the successful proper positioning of the platform 7 inside the chamber 20. Once that proper positioning has been achieved, detected, and signaled by the switch 11, this triggers an automatic closing of the opening 2 by the door 8 (to the extent that, or if, the door 8 has not yet been activated by the light beam devices 5 and 6), and especially also triggers the complete closing, sealing, latching and locking of the door 8 by the latching and locking mechanism 4.

For use of the system in manned space applications, for example in connection with the International Space Station (ISS) or the US Space Shuttle, the apparatus further includes handrails, grips or handles 12, 13 and 14 mounted on the outside of the container 1, for facilitating the activities of astronauts with regard to the inventive system. Particularly, the handrails 12, 13 and 14 make it easy for astronauts to hold onto the container 1 and/or the door 8 while manually carrying out or contributing to the operation of any of the above mentioned approach, capture and docking activities of the platform 7 into the chamber 20 of the container 1. These handrails 12, 13 and 14 further facilitate all other functions and interactions of the astronauts with respect to the inventive system.

After the small free-flying platform 7 has been successfully captured and docked into the chamber 20 of the container 1, the door 8, under the powered actuation of the closing mechanism 3 and the latching and locking mechanism 4, securely presses the platform 7 via the foam cushion or damping pad 19 against another cushion or damping pad or docking cradle 21 on the floor of the container 1. This simultaneously provides the required contact pressure of electrical contact surfaces provided on the platform 7 with mating contact surfaces provided on the docking cradle 21, for establishing necessary electrical connections, e.g. for charging the batteries on-board the platform 7 and/or for connecting to on-board electronics or a computer of the platform 7 for reading-out data and/or carrying out diagnostics or evaluations.

Particularly, this docking of the platform 7 in the container 1 establishes a connection to a monitoring and control station provided inside the space vehicle or space station (not shown). This monitoring and control station allows automated monitoring and control as well as manual monitoring and control by the astronauts on-board the space vehicle or space station. This relates to the monitoring and control of the platform 7 while it is docked in the container 1, or also when the platform 7 is carrying out a free-flying mission, for example via a remote radio link. The monitoring and control can also relate to the monitoring and control of the servicing and inspection apparatus itself.

As an alternative to making direct electrical contact for charging the on-board batteries of the platform 7, the necessary charging connection can be an inductive coupling that requires no force to establish or release. Namely, a non-contacting inductive coupling is established between a power or current source 18 provided in the servicing and inspection apparatus and inductive elements 17 provided on the platform 7, whereby these elements 17 take up electrical power through this inductive coupling. The power source 18 may, for example, be chargeable by means of solar panels or the like.

Based on the inspection of the platform 7, for example via the camera 22 and/or via electronic or computerized diagnostics, all necessary servicing is further carried out while the platform 7 is docked in the chamber 20 of the container 1. For example, this may involve refueling of a fuel tank provided on-board the platform 7 via a suitable refueling connection. This servicing may also involve reprogramming of an on-board computer preferably provided on the platform 7.

Once all required servicing has been completed, the platform 7 may simply remain docked and secured within the container 1 until it is needed for its next mission. During this "parking time", the container 1 protects the platform 7, for example against meteorite impacts, cosmic radiation, mechanical shock, etc.

When the platform 7 is needed for its next mission, it is simply released or launched from the container 1 by reversing the steps of the above described docking sequence. When the free-flying platform 7 maneuvers outside of the container 1 in the close range around the manned space vehicle or space station, communication with the platform 7 can be maintained, e.g. via a radio link, through the servicing and inspection apparatus, which is connected to the monitoring and control station provided on-board the space vehicle or space station as described above. Thus, the servicing and inspection apparatus forms the system interface between the free-flying platform and the space vehicle or space station, as well as carrying out all necessary inspection and servicing functions for the free-flying platform and also enabling an automated mission of the platform outside of the space station or space vehicle without requiring EVA procedures of the astronauts.

The servicing and inspection apparatus further provides a safe and secure mechanical docking and latching of the platform 7 during all transport phases, e.g. during lift off and launch of the space vehicle into space. Thereby, the servicing and inspection apparatus secures and protects the platform 7 parked in the container 1, while safely damping the transport shocks, vibrations and other loads through the foam cushions or damping pads 19 as well as the corresponding docking cradle 21.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A system for deployment in space comprising:
a free-flying platform equipped and adapted to carry out one or more utility functions in space;
a servicing and inspection apparatus including a container that defines therein a chamber dimensioned and configured to receive said platform and that has an opening through which said platform may pass into and out of said chamber, a door movably connected to said container so as to be movable between a closed position in which said door closes said opening and an open position in which said door opens said opening, a closing mechanism connected to said door and adapted to selectively move said door to said closed position so as to retain and secure said platform in said chamber in said container, and at least one light beam device that is arranged in said container and that is connected for signal transmission so as to trigger an operation of said closing mechanism when said free-flying platform passes into a path of a light beam emitted by said at least one light beam device, wherein said closing mechanism includes a motor arranged to drive said closing mechanism so as to selectively move said door between said open position and said closed position.

2. The system according to claim 1, wherein said free-flying platform has a substantially spherical outer configuration.

3. The system according to claim 2, wherein said free-flying platform has no outward protrusions or projections extending outwardly beyond said substantially spherical outer configuration.

4. The system according to claim 2, wherein said free-flying platform has a soft resilient outer skin forming said substantially spherical outer configuration.

5. The system according to claim 1, wherein said free-flying platform is equipped with a battery, a fuel tank, maneuvering thrusters, on-board electronics, a communication transmitter and receiver, and at least one item selected from the group consisting of mission-specific instrumentation, a camera, a sensor, and a tool.

6. The system according to claim 1, further comprising a space vehicle or a space station, wherein said servicing and inspection apparatus is mounted on an outside of said space vehicle or said space station.

7. The system according to claim 6, further comprising a monitoring and control station that is arranged inside said space vehicle or said space station and that includes monitoring, control and communication electronics enabling an astronaut in said space vehicle or said space station to monitor, control and communicate with said free-flying platform outside of said space vehicle or said space station.

8. The system according to claim 1, wherein said apparatus further comprises at least one of a positioning mark and a reflector arranged on an inner side of said door or on an inner upper rim of said container around said opening, and cooperating with said light beam emitted by said at least one light beam device.

9. The system according to claim 1, wherein said apparatus further comprises a light emitting diode arranged on an inner side of said door or on an inner upper rim of said container and adapted to be used to detect a position of said free-flying platform.

10. The system according to claim 1, wherein said container includes sloping inner walls that taper inwardly away from said opening and bound said chamber to have a tapering funnel-shape.

11. The system according to claim 1, wherein said apparatus further comprises a camera arranged in said container.

12. The system according to claim 1, wherein said apparatus further comprises a photoelectric switch that is adapted to detect a position of said free-flying platform and is arranged in said container.

13. The system according to claim 1, wherein said apparatus further comprises a cushion that is arranged on an inner side of said door and that is configured, dimensioned and positioned to press against and fixedly hold said free-flying platform in a docked position in said chamber when said door is in said closed position, and said apparatus further comprises a docking cradle that is arranged in said container on a side of said chamber opposite said opening and that is configured, dimensioned and positioned to receive and fixedly hold said free-flying platform in said docked position.

14. The system according to claim 1, wherein said free-flying platform is equipped with a battery, and wherein said apparatus further comprises an electrical power source and at least one of an electrical contact and an inductive coupling connected to said power source and arranged and adapted to supply electrical power to said free-flying platform in said chamber so as to re-charge said battery of said free-flying platform.

15. The system according to claim 1, wherein said free-flying platform is equipped with on-board electronics and electrical connector contacts connected to said electronics, and wherein said apparatus further comprises electrical connector contacts adapted and arranged to mate with said electrical connector contacts of said free-flying platform when said free-flying platform is in a docked position in said chamber.

16. The system according to claim 1, wherein said free-flying platform is equipped with a fuel tank and a fuel filling connection connected thereto, and said apparatus further comprises a refueling connection arranged and adapted to connect to said fuel filling connection when said free-flying platform is in a docked position in said chamber.

17. A system for deployment in space comprising:
a space vehicle or a space station;
a free-flying platform equipped and adapted to carry out one or more utility functions in space, wherein said free-flying platform is equipped with a battery, a fuel tank, maneuvering thrusters, on-board electronics, a communication transmitter and receiver, and at least one item selected from the group consisting of mission-specific instrumentation, a camera, a sensor, and a tool, and wherein said free-flying platform has a substantially spherical outer configuration;
a servicing and inspection apparatus mounted on an outside of said space vehicle or said space station and including a container that defines therein a chamber dimensioned and configured to receive said platform and that has an opening through which said platform may pass into and out of said chamber, a door movably connected to said container so as to be movable between a closed position in which said door closes said opening and an open position in which said door opens said opening, a closing mechanism connected to said door and adapted to selectively move said door to said closed position so as to retain and secure said platform in said chamber in said container, and at least one light beam device that is arranged in said container and that is connected for signal transmission so as to trigger an operation of said closing mechanism when said free-flying platform passes into a path of a light beam emitted by said at least one light beam device, wherein said closing mechanism includes a motor arranged to drive said closing mechanism so as to selectively move said door between said open position and said closed position; and
a monitoring and control station that is arranged inside said space vehicle or said space station and that includes monitoring, control and communication electronics enabling an astronaut in said space vehicle or said space station to monitor, control and communicate with said free-flying platform outside of said space vehicle or said space station.

18. A method of using the system according to claim 17, comprising the steps of:

a) launching said space vehicle or said space station from earth into an orbit in space, while keeping said free-flying platform secured in said chamber of said servicing and inspection apparatus with said door in said closed position;

b) in said orbit, moving said door from said closed position to said open position and releasing said free-flying platform from said chamber;

c) after said step b), flying said free-flying platform in space outside of said space vehicle or said space station and performing said one or more utility functions using said at least one item selected from the group consisting of said mission-specific instrumentation, said camera, said sensor, and said tool, under control of said astronaut via said monitoring and control station inside said space vehicle or said space station;

d) after said step c), returning said free-flying platform into said chamber of said servicing and inspection apparatus, and then moving said door from said open position to said closed position; and e) after said step d), servicing said free-flying platform in said chamber by at least one of recharging said battery and refueling said fuel tank.

* * * * *